(12) United States Patent
Corghi

(10) Patent No.: US 12,152,955 B2
(45) Date of Patent: Nov. 26, 2024

(54) APPARATUS AND METHOD FOR LOCKING A WHEEL IN A BALANCING MACHINE

(71) Applicant: NEXION S.P.A., CORREGGIO (IT)

(72) Inventor: Giulio Corghi, Correggio (IT)

(73) Assignee: NEXION S.P.A., Correggio (IT)

( * ) Notice: Subject to any disclaimer, the term of this patent is extended or adjusted under 35 U.S.C. 154(b) by 0 days.

(21) Appl. No.: 17/501,487

(22) Filed: Oct. 14, 2021

(65) Prior Publication Data

US 2022/0120631 A1    Apr. 21, 2022

(30) Foreign Application Priority Data

Oct. 19, 2020    (IT) .......................... 102020000024586

(51) Int. Cl.
*G01M 1/02*    (2006.01)

(52) U.S. Cl.
CPC ..................................... *G01M 1/02* (2013.01)

(58) Field of Classification Search
CPC ................................................ G01M 1/02–08
See application file for complete search history.

(56) References Cited

U.S. PATENT DOCUMENTS

| | | | | |
|---|---|---|---|---|
| 4,202,213 | A * | 5/1980 | Toriselli | G01M 1/045 73/487 |
| 10,132,720 | B2 | 11/2018 | Corghi | |
| 2004/0035203 | A1* | 2/2004 | Rothamel | G01M 1/045 73/487 |

(Continued)

FOREIGN PATENT DOCUMENTS

| | | |
|---|---|---|
| DE | 202012007240 U1 | 8/2012 |
| EP | 3067223 B1 | 3/2017 |

(Continued)

OTHER PUBLICATIONS

English Translation of DE202012007240U1 (Year: 2012).*

*Primary Examiner* — Alexander A Mercado
(74) *Attorney, Agent, or Firm* — Pearne & Gordon LLP; Bryan M. Gallo

(57) ABSTRACT

An apparatus for locking a wheel in a balancing machine comprises: a first casing (2), extending along a working axis (D1), a second casing (3), disposed inside the first casing (2) and movable along the working axis (D1) relative to the first casing (2) to adopt an open position (PA) and a closed position (PC) which are spaced from each other along the working axis (D1), a first lever (4), hinged to the first end (3A) of the second casing (3) at a hinge (31) to rotate between an extracted position (PE1) and a retracted position (PR1); a second lever (5), hinged at the hinge (31) of the second casing (3) to rotate between a respective extracted position (PE2) and a respective retracted position (PR2). The first lever (4) and the second lever (5) include a respective first apex (41) and a second apex (51). When the second casing (3) is at the open position (PA), the first apex (41) and the second apex (51) are disposed at a corresponding first apex position. When the second casing (3) is at the closed position (PA), the first apex (41) and the second apex (51) are disposed at a corresponding second apex position. For both the first apex (41) and the second apex (51), the first apex position is further back than the second apex position in a locking direction (VB) along the working axis (D1).

13 Claims, 5 Drawing Sheets

(56) References Cited

U.S. PATENT DOCUMENTS

| | | | | |
|---|---|---|---|---|
| 2006/0266105 A1* | 11/2006 | Stieff | ................... | G01M 1/045 |
| | | | | 73/146 |
| 2016/0266010 A1* | 9/2016 | Corghi | ................ | B60C 25/0536 |
| 2018/0372575 A1* | 12/2018 | Sotgiu | ...................... | G01N 3/04 |
| 2018/0372576 A1* | 12/2018 | Sotgiu | ................ | B60C 25/0536 |

FOREIGN PATENT DOCUMENTS

| | | |
|---|---|---|
| EP | 3418708 A1 | 12/2018 |
| WO | 2019/092768 A1 | 5/2019 |

\* cited by examiner

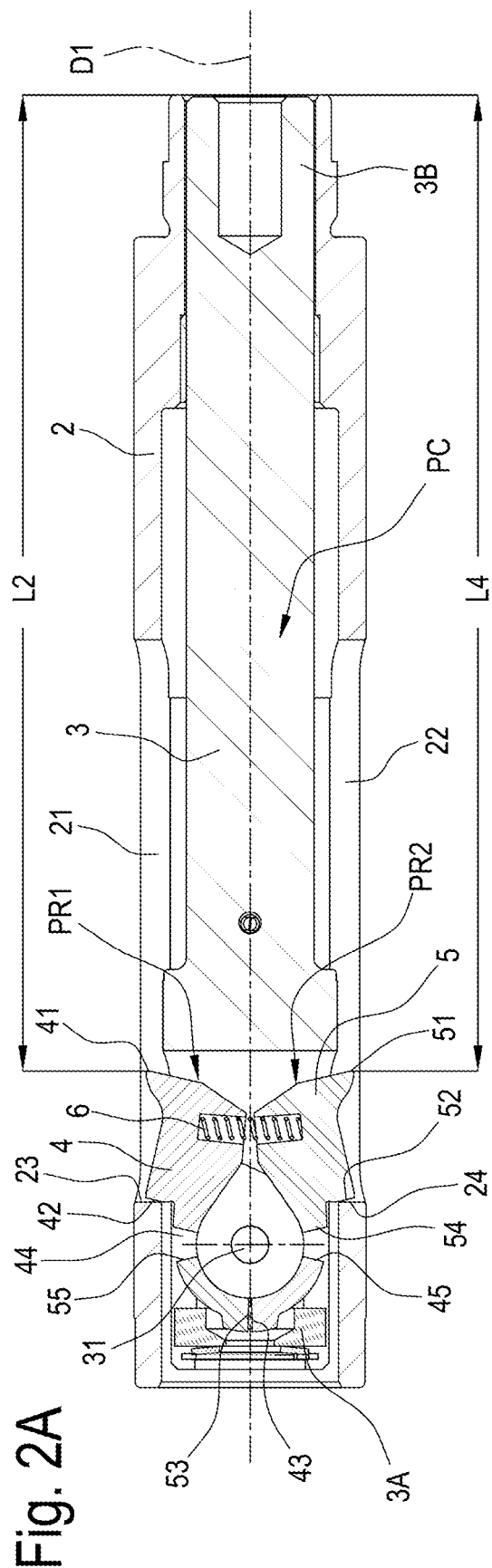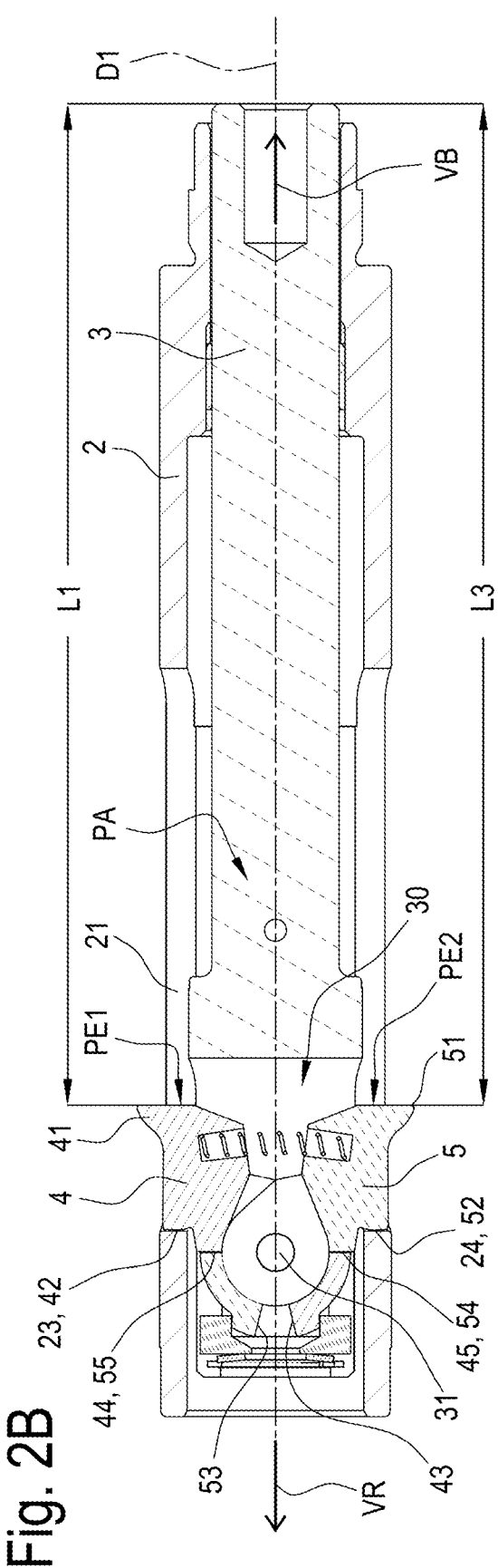

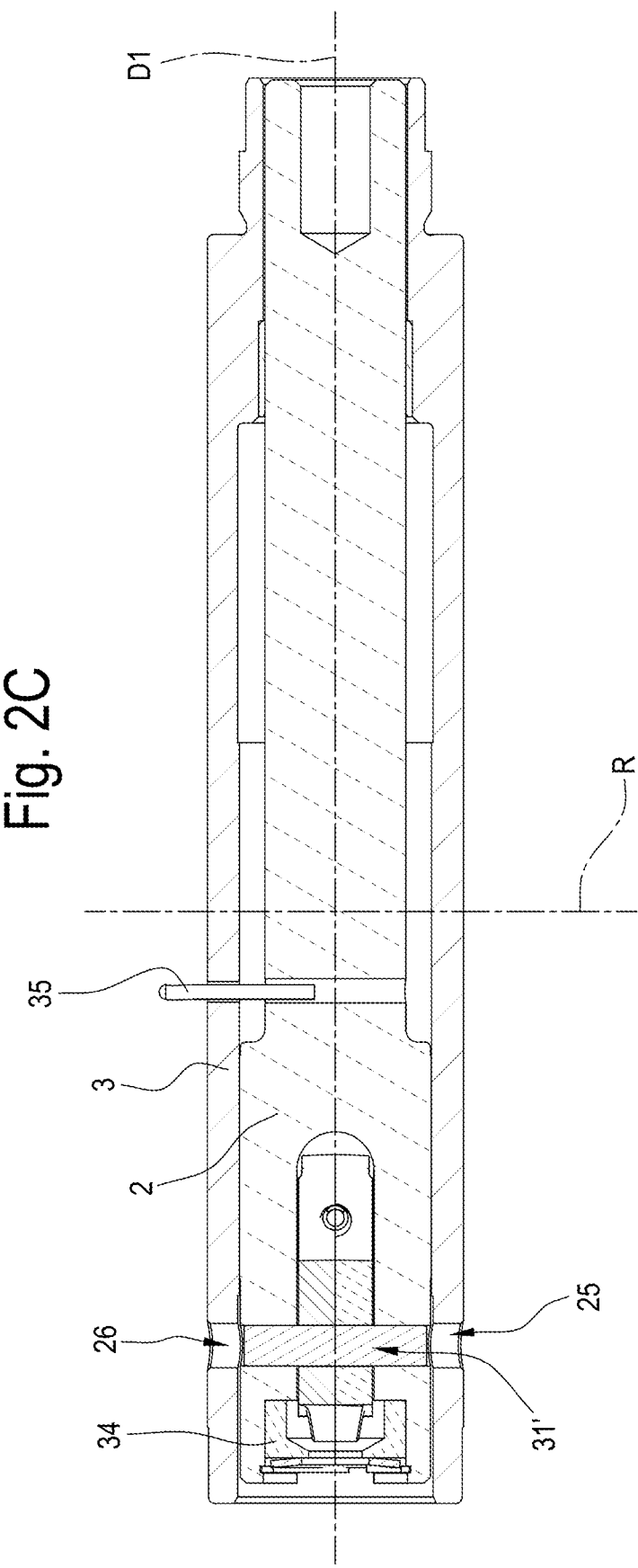

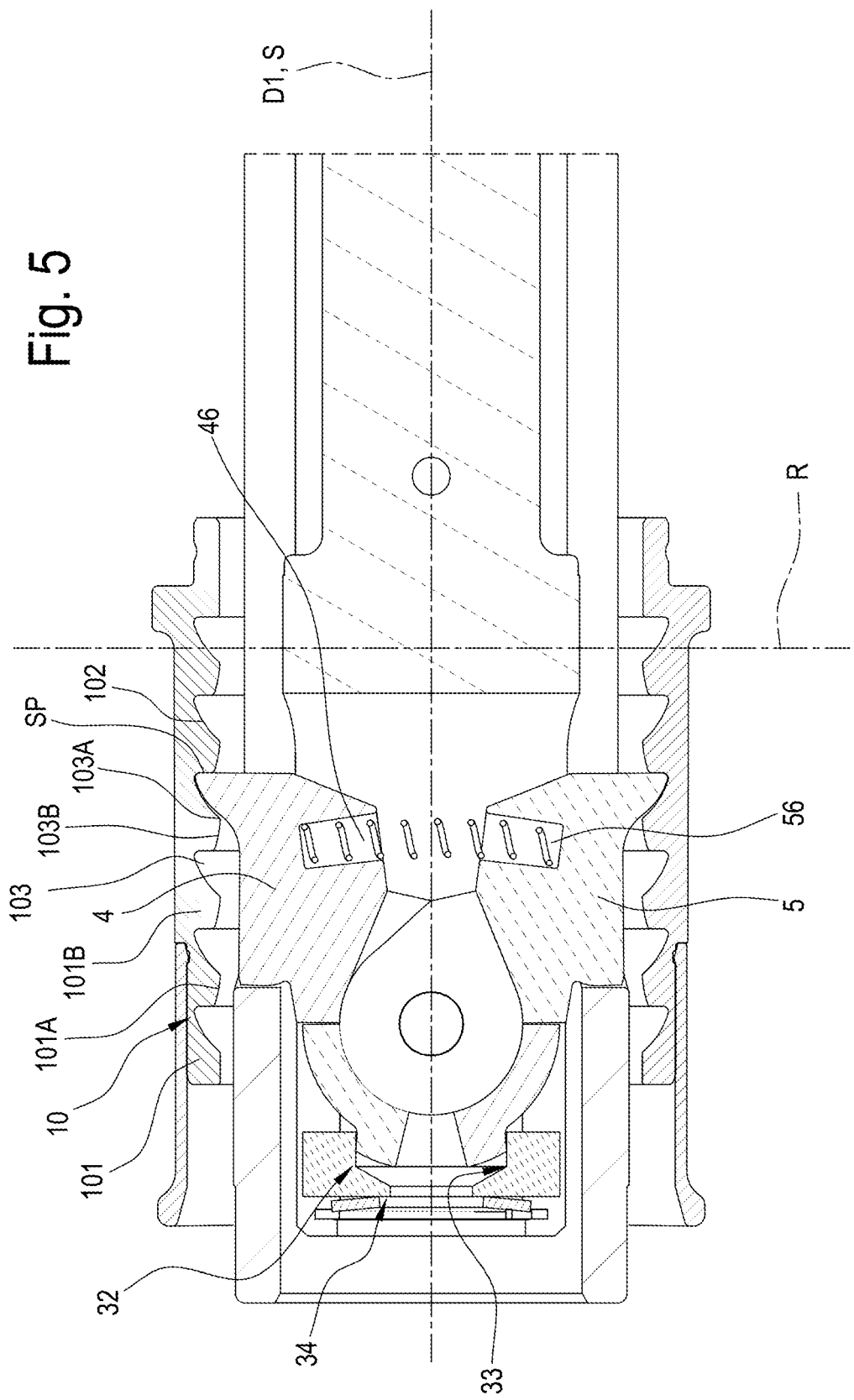

APPARATUS AND METHOD FOR LOCKING A WHEEL IN A BALANCING MACHINE

This invention relates to a locking apparatus, a locking device and a locking unit for locking a wheel in a balancing machine and to a method for locking a wheel in a balancing machine. More specifically, in balancing machines, the wheel to be balanced has to be locked to a rotating chuck of the balancing machine.

To carry out this operation, a locking unit, comprising a locking apparatus and a locking device, is used. The known method of doing this involves inserting the locking apparatus in the wheel hub and connecting the locking apparatus to the chuck. The mounting apparatus includes an inner sleeve tube which is provided with pawls and which slides relative to an outer casing of the mounting apparatus. The user positions the locking device on the side opposite the wheel relative to the chuck. The locking device surrounds the locking apparatus. The movement of the inner sleeve tube causes the pawls to move outwards in such a way as to engage corresponding cavities on the locking device. That way, as it slides towards the chuck, the sleeve tube entrains with it the locking device which comes into abutment against the wheel rim, thereby locking the wheel in balancing position. When the balancing operation is over, the inner sleeve tube slides in the opposite direction, causing the pawls to move back inside and thereby releasing the locking device, which can be removed manually to allow the wheel to be withdrawn.

Examples of locking units are described in documents EP3067223B1 and WO2019092768A1.

In these solutions, the pawls are moved back inwards by abutting against return rings which are attached to the outer casing of the locking apparatus. Owing to the considerable shear stress, these rings are subject to substantial wear and frequent failure, increasing maintenance requirements and costs for spares.

Also, in these solutions, the pawls have a tendency to move non-symmetrically, which means the locking apparatus and the locking device do not fit together perfectly.

Moreover, the design of the prior art solutions is such that the pawls are subject to jamming as they move outwards. In other words, not knowing the exact axial position of the pawls relative to the locking device means that the pawls are not perfectly radially aligned with the cavities, resulting in jamming which leads to damage to the components and incorrect locking of the wheel.

Other systems for locking a wheel in a balancing machine are disclosed in the following documents: DE202012007240U1 and EP3418708A1.

The aim of this disclosure is to provide a locking apparatus, device and unit to overcome the abovementioned drawbacks of the prior art. Another aim of this invention is to provide a wheel locking method that overcomes the above mentioned disadvantages of the prior art.

This aim is fully achieved by the apparatus, device, unit and method of this disclosure as characterized in the appended claims.

According to an aspect of it, this disclosure provides an apparatus for locking a wheel in a balancing machine.

The apparatus comprises a first casing. The first casing extends along a working axis. The first casing is hollow inside. The first casing includes a first slot. The first casing includes a second slot. The first and the second slot pass through the first casing. In other words, they are open to both the inside of the first casing and the outside of the first casing. The first and the second slot extend along the working axis.

The apparatus comprises a second casing. The second casing extends along the working axis between a first end and a second end. The second casing is disposed inside the first casing. A second casing is movable along the working axis relative to the first casing to adopt an open position and a closed position which are spaced from each other along the working axis.

The apparatus comprises a first lever. The first lever is angularly aligned with the first slot. The first lever is hinged to the first end of the second casing at a hinge. The first lever is rotatable about the hinge between an extracted position, where it protrudes from the first slot, and a retracted position. The first lever includes a respective first apex. At the retracted position, the first apex is disposed at one of the following positions:

inside the first casing;
inside the first slot, flush or not flush with the outside surface of the second casing.

Whatever the case, at the retracted position, the first lever does not protrude from the first slot—that is to say, it does not, along the working axis, interfere with a movement of a locking device.

The apparatus comprises a second lever. The second lever is angularly aligned with the second slot. The second lever is hinged at the hinge of the second casing. The second lever is rotatable about the hinge between a respective extracted position, where it protrudes from the second slot, and a respective retracted position. The second lever includes a respective second apex.

At the retracted position, the second apex is disposed at one of the following positions:

inside the first casing;
inside the second slot, flush or not flush with the outside surface of the second casing.

Whatever the case, at the retracted position, the second lever does not protrude from the second slot—that is to say, it does not, along the working axis, interfere with a movement of the locking device.

When the second casing is at the open position, the first and the second lever each adopt the respective extracted position. When the second casing is at the open position, the first apex and the second apex are disposed at a corresponding first apex position.

When the second casing is at the closed position, the first and the second lever each adopt the respective retracted position. When the second casing is at the closed position, the first apex and the second apex are disposed at a corresponding second apex position.

In an embodiment, the apparatus comprises a holding element. The holding element is connected to the first and the second lever to hold each at the respective extracted position.

According to an aspect of this disclosure, the first apex position of the first apex is further back than the second apex position of the first apex along the working axis in a locking direction oriented from the first to the second end of the second casing. Likewise, the first apex position of the second apex is further back than the second apex position of the second apex along the working axis in the locking direction.

In other words, the first apex position of the first apex is offset in a releasing direction, opposite to the locking direction, relative to the second apex position of the first apex along the working axis. Likewise, the first apex position of the second apex is offset in a releasing direction relative to the second apex position of the first apex along the working axis.

The fact that the apex of each lever is further back when the lever is fully open provides an important technical effect—that is to say, it considerably reduces the probability of the pawl jamming on a locking device it is connectable to. In effect, the further back position allows the pawl to be inserted into a respective cavity whatever the position relative to the locking device when the pawl opens.

It is observed that the first and the second apex position are considered with respect to an absolute reference, for example with respect to the apparatus and not with respect to a relative reference, for example the hinge. Hence, the first and the second apex position are determined not only as a consequence of a rotation of the first and the second lever, respectively, but also as a consequence of a translation, along the working direction, of the whole group including, inter alia, the hinge, the first lever and the second lever.

In an embodiment, the first and the second lever comprise a first recessed surface and a second recessed surface, respectively. The first casing also comprises a first and a second abutment wall. The first and the second abutment wall each include a respective inner edge, a respective outer edge and a respective abutment surface. The abutment surface is radially interposed between the corresponding inner edge and the corresponding outer edge. The first and the second recessed surface are configured to come into abutment against the first and the second abutment wall at the abutment surface, respectively. This allows converting a displacement of the second casing along the working axis in the releasing direction into a rotation of the first or the second lever from the respective extracted position to the respective retracted position. Further, since the first and the second recessed surface contact the abutment surfaces and not their inner edges, the forces are more distributed and the stresses applied on the elements are reduced. The lower stress also allows reducing the risk of breaking the pawls and/or the abutment surfaces on the first casing.

In an embodiment, the first and the second recessed surface have a curved profile. The first and the second recessed surface are configured to roll (or roto-translate) on the respective first and second abutment surface. This feature further reduces the stress on the parts involved in the displacement. In effect, rolling or roto-translation allows obtaining optimum pressure angles which allow minimizing the shearing forces on the hinge on which the levers rotate, separating the reagent force from the abutment walls so as to maximize the tangential force responsible for rotating the levers.

In an embodiment, the first and the second abutment wall are defined by one end of the first and the second slot proximal to the first end of the second casing, respectively. Thanks to this aspect, the first and the second abutment wall have a very high strength which significantly reduces the probability of failure by shearing of the first and the second abutment wall.

In an embodiment, when the second casing is at the open position, the hinge is at a position further back from the first and the second slot along the working axis in the locking direction. That means a smaller sweep angle, compared to the state of the art, to allow completely closing the levers. Once again, this aspect cooperates with the others to reduce the mechanical forces acting on the components, thereby effectively reducing the displacement along the working axis that is needed to completely close the first and the second lever.

In an embodiment, the first lever comprises a first abutment wing, disposed on the side opposite to the first apex, relative to the hinge. In an embodiment, the first lever comprises a second abutment wing, disposed on the side opposite to the second apex, relative to the hinge. Advantageously, the first and the second wing are configured to come into contact when the first and the second lever are at the retracted position. This contact provides an abutment for the two levers to limit their rotation in the closing direction so that the two levers are not at different angular positions when they open.

In an embodiment, the first lever comprises a first limit stop. The first lever comprises a first abutment. The first limit stop and the first abutment are located on opposite sides of the first lever relative to the hinge. The second lever comprises a second limit stop. The second lever comprises a second abutment. The second limit stop and the second abutment are located on opposite sides of the second lever relative to the hinge.

In an embodiment, when the first and the second lever are at the extracted position, the first limit stop comes into contact with the second abutment and the second limit stop comes into contact with the first abutment. This allows symmetrically opening the first and the second lever, whose rotation to the extracted position is limited by the corresponding limit stop and the corresponding abutment.

In an embodiment, the holding element is a compression spring. Preferably, the compression spring is oriented perpendicularly to the working axis. The compression spring is configured to apply a force which moves the first and second levers apart to hold each at the respective extracted position.

According to an aspect of it, this disclosure provides a locking device for locking a wheel in a balancing machine.

The locking device comprises a hollow cylindrical casing (or jacket). The cylindrical casing extends along an axis of extension. The hollow cylindrical casing includes a cylindrical inside surface and a cylindrical outside surface.

The locking device comprises a ratchet. The ratchet is made on the cylindrical inside surface of the hollow cylindrical casing. The ratchet includes a plurality of circumferential grooves. The circumferential grooves each include a first edge and a second edge.

Advantageously, the second edge is chamfered to facilitate coupling each groove with a lever of a locking apparatus for locking a wheel in a balancing machine.

This feature of the locking device further reduces the probability of the lever jamming on the ratchet made on the hollow cylindrical casing.

According to an aspect of it, this disclosure provides a locking unit for locking a wheel in a balancing machine. The locking unit comprises a locking device according to one or more of the features described in this disclosure. The locking unit comprises a locking apparatus according to one or more of the features described in this disclosure. More specifically, the first and the second lever of the locking apparatus are configured to be coupled with the plurality of circumferential grooves of the locking device.

According to an aspect of it, this disclosure provides a method for locking a wheel in a balancing machine. The balancing machine comprises a chuck, a locking device and a locking apparatus, connected to the chuck according to one or more of the features described in this disclosure.

The method comprises a step of positioning the wheel on the balancing machine with the locking apparatus inserted in the wheel hub.

The method comprises a step of coupling a locking device to the locking apparatus.

The method comprises a step of rotating the first lever about the hinge between a retracted position and an extracted position, where it protrudes from the first slot.

The method comprises a step of rotating the second lever about the hinge between a respective retracted position and a respective extracted position, where it protrudes from the second slot.

In an embodiment, the method comprises a step of holding the first and the second lever at the extracted position by means of a holding element.

The method comprises a step of moving the second casing between a closed position, where the first and the second lever adopt the retracted position, with the first and the second apex each positioned at a corresponding second apex position, and an open position, where the first and the second lever adopt the respective extracted position, with the first and the second apex each positioned at a corresponding first apex position.

In an embodiment, for both the first apex and the second apex, the first apex position is further back than the second apex position along the working axis in a locking direction oriented from the first to the second end of the second casing.

In an embodiment, the method comprises a step of contacting, in which a first recessed surface of the first lever and a second recessed surface of the second lever come into contact with a first and second abutment wall of the first casing, respectively. In the step of contacting, the first recessed surface of the first lever and the second recessed surface of the second lever come into contact with the first and the second abutment wall at a respective abutment surface, which is radially interposed between a respective inner edge and a respective outer edge of the first or the second abutment wall.

In an embodiment of the method, the step of contacting comprises a step of rolling (or roto-translating) the first and the second recessed surface on the respective abutment surface of the first abutment wall and second abutment wall, respectively.

In an embodiment, in the step of moving the second casing, the hinge adopts a position further back from the first and the second abutment wall along the working axis in the locking direction.

The method comprises a step of abutting, in which, when the first and the second lever are at the retracted position, a first abutment wing of the first lever, disposed on the side opposite to the first apex relative to the hinge, comes into contact with a second abutment wing of the second lever, disposed on the side opposite to the second apex relative to the hinge.

These and other features will become more apparent from the following detailed description of a preferred embodiment, illustrated by way of non-limiting example in the accompanying drawings, in which:

FIGS. 2A and 2B show a cross section of a locking apparatus for the locking unit of the balancing machine of FIG. 1 in a first, closed operating configuration and a second, open operating configuration, respectively;

FIG. 2C shows a cross section, rotated by 90 degrees compared to the cross section shown in FIG. 2A, relating to the first operating configuration;

FIG. 5 shows a cross section of the locking unit of the balancing machine of FIG. 1.

Figure 1:
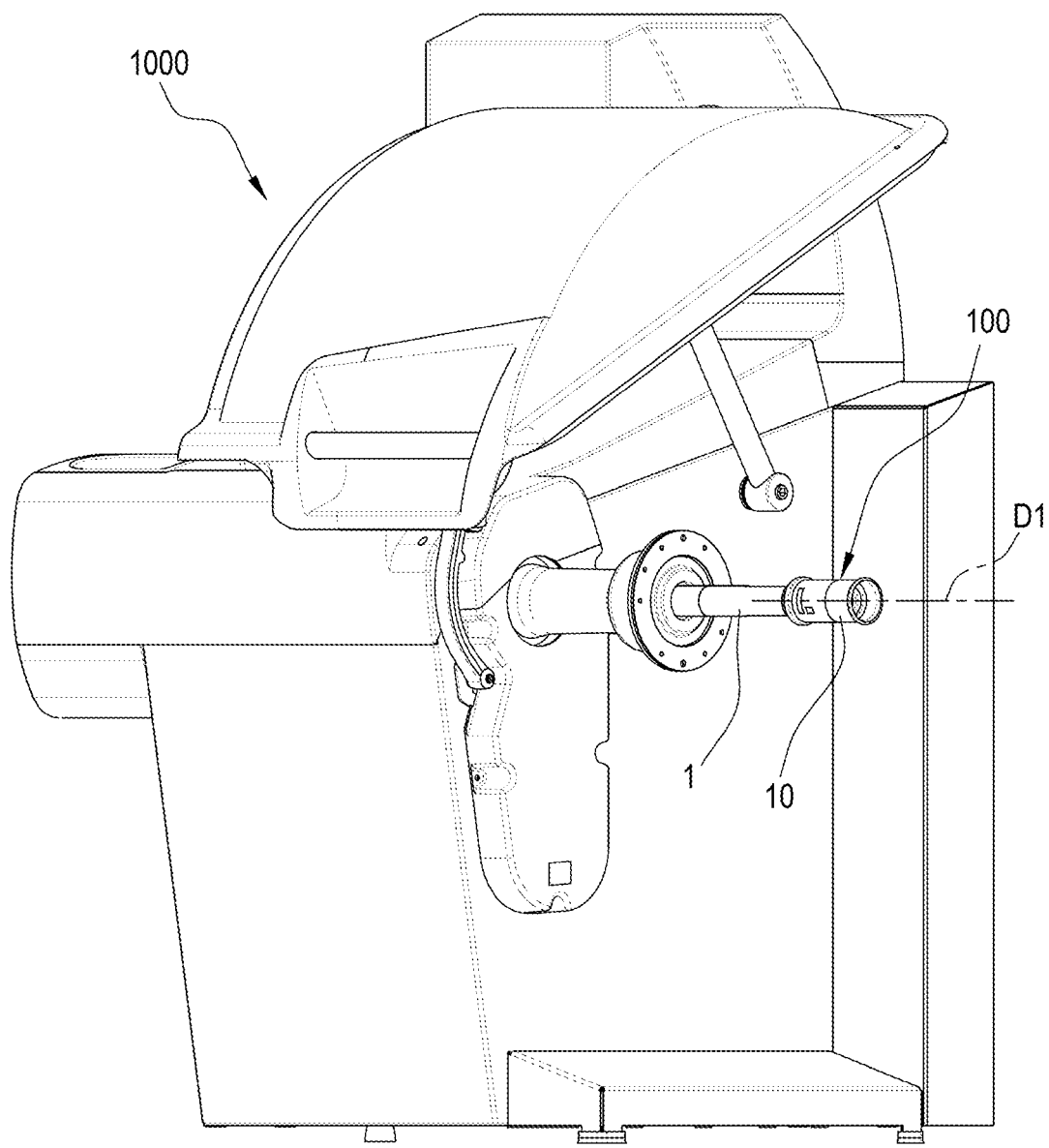
FIG. 1 shows a perspective view of a balancing machine with a locking unit for locking the wheel.
Figure 3:
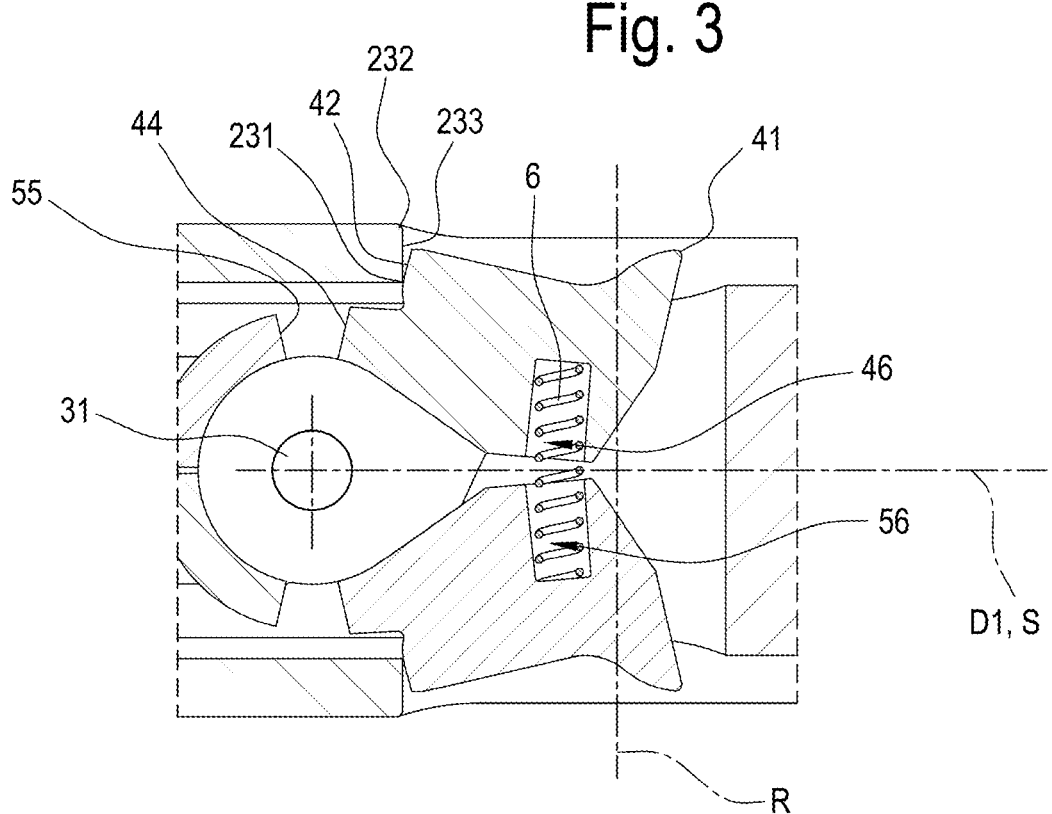
FIG. 3 shows a cross section of a detail of a lever of the apparatus of FIG. 2A.
Figure 4:
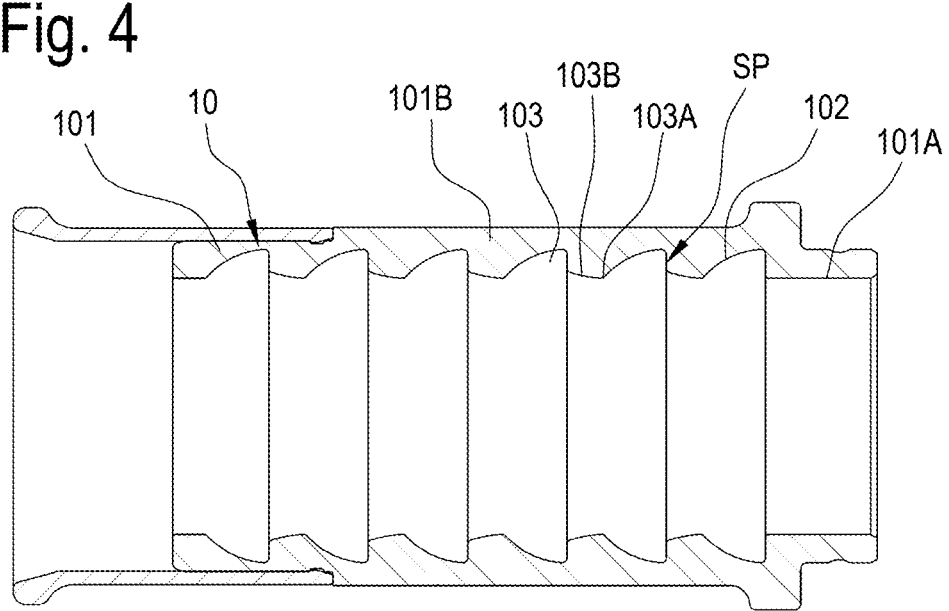
FIG. 4 shows a cross section of a locking device of the locking unit of the balancing machine of FIG. 1.

With reference to the accompanying drawings, the numeral 1 denotes a locking apparatus for locking a wheel in a balancing machine 1000. In addition, the numeral 10 denotes a locking device configured to be coupled to the apparatus 1 to lock the wheel in the balancing machine 1000. The numeral 100, on the other hand, denotes the locking unit, which comprises the apparatus 1 and the device 10.

The apparatus 1 comprises a first casing 2. The first casing 2 extends along a working axis D1. The first casing 2 extends along the working axis D1 between a first end, which is configured to be connected to a chuck of the balancing machine 1000, and a second end, opposite to the first end. The first casing 2 is internally hollow and defines an internal space.

The apparatus 1 comprises a second casing 3. The second casing 3 extends along the working axis D1 between a first end 3A, spaced from the chuck of the balancing machine 1000, and a second end 3B, close to the chuck of the balancing machine 1000.

In an example embodiment, the apparatus 1 comprises a contoured element 34 which is operatively fixed to the second casing 3, thereby constituting the first end 3A of the second casing 3. In an example embodiment, the contoured element 34 is held in place by a cup spring and a circlip.

The first casing 2 comprises a first slot 21. The first slot 21 extends along the working axis D1. The first slot 21 extends along a portion of the length of the first casing 2.

The first slot 21 is a through slot that puts the internal space of the first casing 2 in communication with a zone outside the first casing 2.

The first casing 2 comprises a second slot 22. The second slot 22 extends along the working axis D1. The second slot 22 extends along a portion of the length of the first casing 2.

The second slot 22 is a through slot that puts the internal space of the first casing 2 in communication with a zone outside the first casing 2.

In an embodiment, the first casing 2 is an axisymmetric casing, preferably a hollow cylinder having an axis of symmetry S.

In an embodiment, the first slot 21 and the second slot 22 are located on opposite sides of the axis of symmetry S. The first slot 21 and the second slot 22 are perpendicular to a radial axis R, perpendicular to the working axis D1.

In an embodiment, the first casing 2 is open to the outside at its first and second ends. The openings at the ends of the first casing 2 are perpendicular to the working axis D1.

In an embodiment, the first casing 2 comprises a first opening 25 and a second opening 26.

The first opening 25 and the second opening 26 are aligned with each other along an axis which passes through the axis of symmetry S.

In an embodiment, the first slot 21 comprises a respective first end which defines a first abutment wall 23. More specifically, the end of the first slot 21 that defines the first abutment wall 23 is the end that is proximal to the first end 3A of a second casing 3. The first abutment wall 23 comprises a respective inner edge 231, which faces towards the internal space of the first casing 2. The first abutment wall 23 comprises a respective outer edge 232, which faces towards the outside of the first casing 2.

The first abutment wall 23 comprises a respective abutment surface 233, which is radially interposed between the inner edge 231 and the outer edge 232. In an embodiment, the first abutment surface 233 has a flat profile. In an embodiment, the first abutment surface 233 has a curved profile. In an embodiment, the first abutment surface 233 has an involute profile.

In an embodiment, the second slot 22 comprises a respective first end which defines a second abutment wall 24. More specifically, the end of the second slot 22 that defines the second abutment wall 24 is the end that is proximal to the first end 3A of the second casing 3. The second abutment wall 24 comprises a respective inner edge 241, which faces towards the internal space of the first casing 2. The second abutment wall 24 comprises a respective outer edge 242, which faces towards the outside of the first casing 2.

The second abutment wall 24 comprises a respective abutment surface 243, which is radially interposed between the inner edge 241 and the outer edge 242. In an embodiment, the second abutment surface 243 has a flat profile. In an embodiment, the second abutment surface 243 has a curved profile. In an embodiment, the second abutment surface 243 has an involute profile.

The second casing 3 is movable along the working axis D1, relative to the first casing 2. The second casing 3 is (at least partly) inserted in the internal space of the first casing 2. In a preferred embodiment, the second casing 3 is an axisymmetric solid, or a (variable diameter) cylinder, whose axis of symmetry coincides with the axis of symmetry S of the first casing 2.

As it moves along the working axis D1, the second casing 3 defines an open position PA and a closed position PC.

The first end 3A of the second casing 3 is spaced from the chuck by a first distance along the working axis D1 when the second casing 3 is at the open position PA. The first end 3A of the second casing 3 is spaced from the chuck by a second distance along the working axis D1 when the second casing 3 is at the closed position PC. The second distance is greater than the first distance.

The second casing 3 comprises a housing cavity 30 which crosses the second casing 3.

The second casing 3 comprises a hinge 31, located at the housing cavity 30. The hinge 31 comprises a lever rotation pin 31'.

The second casing 3 comprises a first and a second shoulder wall 32, 33, located at its first end 3A. The first and second shoulder walls 32, 33 are defined by the shape of the housing cavity 30. The first and second shoulder walls 32, 33 are configured to abut against the second lever 5 and the first lever 4 at the respective extracted position PE1, PE2, respectively.

In an embodiment, the second casing 3 comprises at least one maintenance position, along the working axis D1, where the pin 31' of the hinge 31 is aligned with the first opening 25 and the second opening 26. Thus, when maintenance needs to be carried out, the pin 31' of the hinge 31 can easily be removed by inserting a removal tool into the first opening 23 to push the pin 31' of the hinge 31 out of its housing made in the second casing 3, passing through the second opening 26.

That way, maintenance can be carried out more quickly and easily. In an embodiment, the apparatus 1 comprises a first lever 4. The first lever 4 is connected to the second casing 3 by the hinge 31. More specifically, the first lever 4 comprises a respective hub, in which the pin 31' of the hinge 31 is located. The first lever 4 is angularly aligned with the first slot 21 so that the first lever 4 can come out of the first slot 21 along a radial axis R.

The first lever 4 is rotatable about the hinge 31 between a retracted position PR1 and an extracted position PE1. At the retracted position PR1, the first lever 4 is at a position further back from the outer edge of the first slot 21. At the extracted position PE1, the first lever 4 protrudes from the first slot 21.

The first lever 4 comprises a first apex 41. When the first lever 4 is at the extracted position PE1, the first apex 41 defines an end that is further out along the radial axis R.

The first lever 4 comprises a first recessed surface 42. The first recessed surface 42 faces in a releasing direction VR, oriented from the second end 3B to the first end 3A of the second casing 3.

In an embodiment, the first recessed surface 42 has a curved profile. In an embodiment, the first recessed surface 42 has an involute profile.

In an embodiment, the first abutment wall 23 is configured to abut against the first recessed surface 42. Preferably, the abutment surface 233 of the first abutment wall 23 is configured to abut against the first recessed surface 42.

More specifically, the first lever 4 is configured to move along the working axis D1, entrained (in translation) by the second casing 3. In other words, the first lever is entrained by the second casing 3 in its displacement along the working axis D1 but maintains the possibility of pivoting about the hinge 31 relative to the second casing 3. Therefore, the first recessed surface 42 comes into contact with the abutment surface 233 of the first abutment wall 23 as a result of a displacement of the second casing 3 along the working axis D1 in the releasing direction. The contact between the first recessed surface 42 and the abutment surface 233 causes the first lever 4 to rotate from the extracted position PE1 to the retracted position PR1. It should be borne in mind that a roto-translation may be considered as a succession of pure rotations carried out at successive instants in time.

More specifically, the second casing 3 is at an open position PA along the longitudinal axis when the first recessed surface 42 comes into contact with the abutment surface 233—that is, when the first lever 4 adopts the extracted position PE1.

Likewise, the second casing 3 is at a closed position PC along the longitudinal axis when the first lever 4 adopts the retracted position PR1. In other words, the rotation of the first lever 4 from the retracted position PR1 to the extracted position PE1 corresponds to a displacement of the second casing 3 along the working axis D1 from the closed position PC to the open position PA.

In an embodiment, when the second casing 3 is at the open position PA, the first apex 41 of the first lever is at a first apex position L1. Likewise, when the second casing 3 is at the closed position PC, the first apex 41 is at a second apex position L2.

Advantageously, the first apex position L1 is further back than the second apex position L2 along the working axis D1 in a locking direction VB, opposite to the releasing direction VR. In other words, the first apex 41 is further back in the direction of displacement of the second casing 3 (along the working axis D1) to cause the first lever 4 to rotate from the respective retracted position PR1 to the respective extracted position PE1.

In an embodiment, the first lever 4 comprises a first abutment wing 43. The first abutment wing 43 includes a surface which is oriented radially relative to the hinge 31.

In an embodiment, the first lever 4 comprises a first limit stop 44. In an embodiment, the first lever 4 comprises a first abutment 45. Preferably, the first limit stop 44 and the first abutment 45 are located on opposite sides of the first lever 4 relative to the hinge 31.

Further, in an embodiment, the first abutment wing 43 and the first abutment 45 are each defined by a respective surface (oriented radially) of a portion of the first lever opposite to the first apex 41, relative to the hinge 31.

In an embodiment, the first lever 4 comprises a first housing socket 46. When the first lever 4 is at the retracted position PR1, the first housing socket 46 is oriented along the radial axis R.

In an embodiment, the apparatus 1 comprises a second lever 5. The second lever 5 is connected to the second casing 3 by the hinge 31. More specifically, the second lever 5 comprises a respective hub, in which the pin 31' of the hinge 31 is located. The second lever 5 is angularly aligned with the second slot 22 so that the second lever 5 can come out of the second slot 22 along a radial axis R.

The second lever 5 is rotatable about the hinge 31 between a retracted position PR2 and an extracted position PE2. At the retracted position PR2, the second lever 5 is at a position further back from the outer edge of the second slot 22. At the extracted position PE2, the second lever 5 protrudes from the second slot 22.

The second lever 5 comprises a second apex 51. When the second lever 5 is at the extracted position PE2, the second apex 51 defines an end that is further out along the radial axis R.

In an embodiment, when the second casing 3 is at the open position PA, the second apex 51 of the second lever 5 is at a first apex position L3, corresponding (along the working axis D1) to the first apex position L1 of the first apex 41 of the first lever 4. Similarly, when the second casing 3 is at the closed position PC, the second apex 51 is at a second apex position L4, corresponding (along the working axis D1) to the second apex position L2 of the first apex 41 of the first lever 4.

The second lever 5 comprises a second recessed surface 52. The second recessed surface 52 faces in the releasing direction VR.

In an embodiment, the second recessed surface 52 has a curved profile.

In an embodiment, the second recessed surface 52 has an involute profile.

In an embodiment, the second abutment wall 24 is configured to abut against the second recessed surface 52. Preferably, the abutment surface 243 of the second abutment wall 24 is configured to abut against the second recessed surface 52.

More specifically, the second lever 5 is configured to move along the working axis D1, entrained in translation by the second casing 3. In other words, the second lever 5 is entrained by the second casing 3 in its displacement along the working axis D1 but maintains the possibility of pivoting about the hinge 31 relative to the second casing 3. Therefore, the second recessed surface 52 comes into contact with the abutment surface 243 of the second abutment wall 24 as a result of a displacement of the second casing 3 along the working axis D1 in the releasing direction VR. The contact between the second recessed surface 52 and the abutment surface 243 causes the second lever 5 to rotate (rot0-translate) from the extracted position PE2 to the retracted position PR2.

More specifically, when the second casing 3 is at the open position PA, the second recessed surface 52 comes into contact with the abutment surface 243—that is, the second lever 5 adopts the extracted position PE2.

Also, when the second casing 3 is at the open position PA, the second lever 5 adopts the retracted position PR2. In other words, the rotation of the second lever 5 from the retracted position PR2 to the extracted position PE2 corresponds to a displacement of the second casing 3 along the working axis D1 from the closed position PC to the open position PA. Thus, the first lever 4 and the second lever 5 rotate simultaneously between the respective retracted position PR1, PR2 and the respective extracted position PE1, PE2 in response to the movement of the second casing 3 between the closed position PC and the open position PA.

In an embodiment, when the second casing 3 is at the open position PA, the second apex 51 of the second lever 5 is at the first apex position L3. Likewise, when the second casing 3 is at the closed position PC, the second apex 51 is at the second apex position L4.

In other words, at the retracted position PR1, PR2 and at the extracted position PE1, PE2 of the first lever 4 and of the second lever 5, the first apex 41 and the second apex 51 are each (substantially) at the first and the second apex position (L1, L3) along the working axis D1, respectively. In effect, in an example embodiment, the pair of levers including the first lever 4 and the second lever 5 is rotatably connected to the pin 31' in such a way as to have freedom of movement in rotation—that is, in such a way as to be able to pivot about the pin 31' (with the first lever 4 and the second lever 5 mutually stationary). This feature allows compensating for possible asymmetries, for example of the pair of levers.

Therefore, in this case, too, the first apex position L3 is further back than the second apex position L4 along the working axis D1 in a locking direction VB. In other words, the second apex 51 is further back in the direction of displacement of the second casing along the working axis D1 which causes the first lever 4 to rotate from the respective retracted position PR1 to the respective extracted position PE1.

In an embodiment, the second lever 5 comprises a second abutment wing 53. The second abutment wing 53 includes a surface which is oriented radially relative to the hinge 31.

In an embodiment, the second lever 5 comprises a second limit stop 54. In an embodiment, the second lever 5 comprises a second abutment 55. Preferably, the second limit stop 54 and the second abutment 55 are located on opposite sides of the second lever 5 relative to the hinge 31.

Further, in an embodiment, the second abutment wing 53 and the second abutment 55 are each defined by a respective surface (oriented radially) of a portion of the second lever 5 opposite to the second apex 51, relative to the hinge 31.

In an embodiment, the second lever 5 comprises a second housing socket 56. When the second lever 5 is at the retracted position PR2, the second housing socket 56 is oriented along the radial axis R.

In an embodiment, the distance between the centre of the pin 31' and the first apex 41 is in the 25-45 mm range, preferably in the 30-40 mm range and, still more preferably, is 35 mm.

In an embodiment, the distance between the centre of the pin 31' and the second apex 51 is the same as the distance between the centre of the pin 31' and the first apex 41.

In an embodiment, the angle swept by the first lever 4 in its rotation from the extracted position PE1 to the retracted position PR1, and vice versa, is included in the interval 8-18 degrees, preferably included in the interval 11-15 degrees and, still more preferably, is 13 degrees.

In an embodiment, the angle swept by the second lever 5 in its rotation from the extracted position PE2 to the retracted position PR2, and vice versa, is the same as the angle swept by the first lever 4.

Preferably, the first lever 4 and the second lever 5 have the same shape. In an embodiment, at the retracted position PR1, PR2 of the first lever 4 and of the second lever 5, the first abutment wing 43 and the second abutment wing 53 are abutted against each other.

In an embodiment, at the extracted position PE1, PE2 of the first lever 4 and of the second lever 5, the first limit stop 44 of the first lever 4 is abutted against the second abutment 55 of the second lever 5. Likewise, at the extracted position PE1, PE2 of the first lever 4 and of the second lever 5, the second limit stop 54 of the second lever 5 is abutted against the first abutment 45 of the first lever 4.

In an embodiment, the apparatus 1 comprises a holding element 6. In an embodiment, the holding element 6 is a spring (that is, a tension spring). The spring 6 is positioned partly inside the first housing socket 46. The spring 6 is positioned partly inside the second housing socket 56. In an embodiment, the spring 6 includes a first and a second end. The first end of the spring 6 is positioned in the first housing socket 46 and the second end of the spring 6 is positioned in the second housing socket 56. The spring 6 is configured to apply a force on the first lever 4 and/or on the second lever 5 having a non-zero lever arm relative to the pin 31'. Thus, the force of the spring produces torque that causes the first lever 4 or the second lever 5 to rotate. More specifically, in an embodiment, the spring 6 is configured to apply a force on the first lever 4 and/or on the second lever 5 which causes the first lever 4 and/or on the second lever 5 to rotate from the respective retracted position PR1, PR2 to the respective extracted position PE1, PE2. The force of the spring 6 also keeps the first lever 4 and the second lever 5 at the respective extracted position PE1, PE2.

Therefore, when the second casing 3 is at the closed position PC, the force that the spring 6 applies on the first lever 4 and on the second lever 5 is released onto an inside surface of the first casing 2, since the first lever 4 and the second lever 5 are not aligned with the first slot 21 and second slot 22 along the radial axis R.

As the second casing 3 moves from the closed position PC to the open position PA, the first and the second lever 4, 5 align radially with the first slot 21 and the second slot 22, respectively. Thus, since there is no longer a wall of the first casing 2 to oppose it, the force of the spring 6 causes the first lever 4 and the second lever 5 to rotate from the retracted position PR1, PR2 to the extracted position PE1, PE2.

In an embodiment, when the second casing 3 is at the open position PA, the hinge 31 is located further back from the first and the second abutment wall 23, 24 along the working axis D1 in the locking direction VB.

In an embodiment, when the second casing 3 is at the open position PA, it is closer to the chuck than it is when it is at the closed position PC, along the working axis D1.

According to an aspect of it, this disclosure provides a locking device 10 for locking a wheel in a balancing machine 1000.

The locking device 10 is configured to be coupled to the locking apparatus 1 described in this disclosure.

More specifically, the device 10 comprises a casing 101, preferably cylindrical. The casing 101 is internally hollow. The casing 101 extends along an axis of extension. In an embodiment, the axis of extension of the hollow casing operatively coincides with the axis of symmetry S (that is, it is parallel to the working axis D1). In use, the casing 101 accommodates the apparatus 1 inside it. In this operating configuration, the axis of extension coincides with the axis of symmetry S.

The hollow casing 101 comprises a cylindrical inside surface 101A. The cylindrical inside surface 101A faces inward and, in use, faces the apparatus 1.

The hollow casing 101 comprises a cylindrical outside surface 101B, opposite to the cylindrical inside surface 101A.

In an embodiment, the device 10 comprises a ratchet 102. The ratchet 102 is formed on the cylindrical inside surface 101A. The ratchet 102 comprises a plurality of crests and roots. More specifically, the alternation of crests and roots defines a plurality of circumferential grooves 103. The circumferential grooves 103 each include a first edge 103A. The circumferential grooves 103 each include a second edge 103B.

The first edge 103A defines a crest of the ratchet 102 in that it corresponds to the portion of the ratchet with the smaller diameter. More specifically, the first edge 103A is spaced from the axis of symmetry by a first radial distance. The second edge 103A is spaced from the axis of symmetry S by a second radial distance, greater than the first radial distance.

In a preferred embodiment, the second edge 103B is chamfered. This prevents the first lever 4 and the second lever 5 from jamming in the circumferential grooves 103.

It is observed that the fact that the second edge 103B is chamfered determines the following structure of the circumferential grooves. The second edge 103B defines an angle which is higher than 90°, thus reducing the stacking problem. Moreover, the first edge 103A and the second edge 103B are connected by a surface which is flat, without any edges on it. Also, the surface is inclined with respect to symmetry axis S. The inclined and flat surface further reduce the stucking problem. In one embodiment, the inclination of the surface is variable along the working direction. In other words, the surface comprises a first zone with a first inclination and a second zone with a second inclination. The first zone and the second zone are connected to each other by a curve profile, which defines a point of continuity between the two zone, avoiding the presence of any edges.

It is also observed that, when the first lever 4 and the second lever 5 rotate from the retracted position PR1, PR2 to the extracted position PE1, PE2, the respective first apex 41 and the respective second apex 51 are inserted in the same circumferential groove 103. The second casing 3 continues moving along the working axis D1 in the locking direction VB, also entraining the locking device 10, which is latched by the shape coupling between the first lever 4, the second lever 5 and the circumferential groove 103. The movement of the second casing 3 continues until the locking device 10 comes into abutment against the wheel rim, locking it to the chuck of the balancing machine 1000.

In an example embodiment, the apparatus 1 also comprises a split pin 35 (a rod-like element) which is operatively insertable into a through hole made in the first casing 2 and in the second casing 3; the function of the split pin 35 is that of mechanically coupling the first casing 2 and the second casing 3, for example to hold them in place relative to each other during transportation; during normal use (operation) of the apparatus, however, the split pin 35 is not inside the hole (or is absent).

According to an aspect of it, this disclosure provides a locking unit 100, which comprises a locking apparatus 1 and a locking device 10.

According to an aspect of it, this disclosure provides a method for locking a wheel in a balancing machine 1000.

The method comprises a step of connecting a locking apparatus 1 to a (rotary) chuck of the balancing machine 1000.

The locking apparatus 1 is connected to the second casing 3 at the closed position PC: that is to say, with the first lever 4 and the second lever 5 at the retracted position PR1, PR2.

The method comprises a step of positioning the wheel. In the step of positioning the wheel, the apparatus 1 is inserted into a hub of the wheel and the wheel is brought into abutment against the chuck.

Preferably, the method comprises a step of positioning a locking device 10. In the step of positioning, the device 10 is positioned around the apparatus 1 with the circumferential grooves radially aligned with the first slot 21 and the second slot 22.

The method comprises a step of latching the device 10 to the apparatus 1. The step of latching comprises a step of moving the second casing 3 along the working axis D1 in the locking direction VB from the closed position PC to the open position PA. The step of latching comprises a step of rotating the first lever 4 from the retracted position PR1 to the extracted position PE1. The step of latching comprises a step of rotating the second lever 5 from the retracted position PR2 to the extracted position PE2.

The step of latching comprises a step of gripping. In the step of gripping, the first lever 4 is inserted into a circumferential groove 103 of the device 10. In the step of gripping, the second lever 5 is inserted into a circumferential groove 103 of the device 10.

More specifically, in the step of gripping, the first apex 41 is inserted into the circumferential groove 103 and the second apex 51 is inserted into the circumferential groove 103.

Also in the step of latching, the first apex 41 takes a backward step along the working axis D1 in the locking direction VB due to its rotation which is greater than the forward movement due to the translation of the second casing 3. In the same way, the second apex 51 performs a backward movement along the working axis D1 in the locking direction VB due to its rotation which is greater than the forward movement due to the translation of the second casing 2. Therefore, the first and the second apex 41, 51 are further forward in the locking direction VB when the second casing 3 is at the closed position PC than they are when the second casing 3 is at the open position PA.

In an embodiment, the step of latching comprises a step of pushing. In the step of pushing, a holding element 6 pushes the first lever 4 and the second lever 5 in such a way as to turn them in opposite directions and cause both the first lever 4 and the second lever 5 to rotate from the respective retracted position PR1, PR2 to the respective extracted position PE1, PE2.

In the step of gripping, the first apex 41, being in the circumferential groove, is abutted against a gripping surface SP of the circumferential groove 103 which receives the force generated by the movement of the second casing 3.

The method comprises a step of locking. In the step of locking, the second casing 3 continues moving along the working axis D1 in the locking direction VB, entraining the device 10 along with it. In the step of locking, the movement of the second casing 3 is interrupted when the device 10 comes into abutment against the wheel and locks the wheel to the chuck of the machine 1000.

In the step of locking, the holding element 6 keeps the first lever 4 and the second lever 5 at the extracted position PE1, PE2.

It should be noted, therefore, that as it moves along the working axis D1, the second casing 3 completes two stretches of displacement: a stretch of gripping and a stretch of locking. In the stretch of gripping, the second casing moves translationally from the closed position PC to the open position PA, thereby causing the first lever 4 and the second lever 5 to open so as to latch onto the device 10. In the stretch of locking, the second casing 3 continues moving translationally along the working axis D1 in the locking direction VB from the open position PA to a locked position, where the device 10, being entrained by the translational movement of the second casing 3, comes into abutment against the wheel rim and locks the wheel to the machine 1000.

According to an aspect of this disclosure, the method also comprises a step of unlocking the wheel, normally carried out when balancing operations have been completed.

The method comprises a step of moving the second casing 3 along the working axis D1 in the releasing direction VR from the locked position to the open position PA. During this movement, the device 10 moves together with the second casing 3 because there are no components to obstruct this translational movement.

The method comprises a step of releasing. In the step of releasing, the second casing moves from the open position PA to the closed position PC. In the step of releasing, the first lever 4 rotates from the extracted position PE1 to the retracted position PR1. In the step of releasing, the second lever 5 rotates from the extracted position PE2 to the retracted position PR2.

More specifically, the step of releasing comprises a step of contacting. In the step of contacting, the first recessed surface 42 of the first lever 4 comes into contact with the first abutment wall 23, which, in an embodiment, is preferably defined by one end of the first slot 21.

More specifically, in the step of contacting, the first recessed surface 42 of the first lever 4 comes into contact with the abutment surface of the first abutment wall 23. According to an aspect of the method, the step of releasing comprises a step of rolling and/or roto-translating the first recessed surface on the abutment surface 233 of the first abutment wall 23.

The contact between the first recessed surface 42 of the first lever 4 and the abutment surface of the first abutment wall 23 converts the displacement of the second casing 3 along the working axis D1 into a rotation of the first lever 4 towards the retracted position PR1, overcoming the resistant force of the spring 6 which, instead, tends to rotate the first lever 4 towards the extracted position PE1.

In the step of rotating the first lever from the extracted position PE1 to the retracted position PR1, the first lever rotates by an angle according to what is described above.

In the step of releasing, the first apex 41 comes out of the circumferential groove 103, thereby releasing the device 10 and allowing it to move along the working axis D1.

In the step of contacting, the second recessed surface 52 of the second lever 5 comes into contact with the second abutment wall 24, which, in an embodiment, is preferably defined by one end of the second slot 22.

More specifically, in the step of contacting, the second recessed surface 52 of the second lever 5 comes into contact with the abutment surface of the second abutment wall 24. According to an aspect of the method, the step of releasing comprises a step of rolling and/or roto-translating the second recessed surface 52 on the abutment surface 243 of the second abutment wall 24.

The contact between the second recessed surface 52 of the second lever 5 and the abutment surface 243 of the second abutment wall 24 converts the displacement of the second casing 3 along the working axis D1 into a rotation of the second lever 5 towards the retracted position PR2, overcoming the resistant force of the spring 6 which, instead, tends to rotate the second lever 5 towards the extracted position PE2.

In the step of rotating the second lever 5 from the extracted position PE2 to the retracted position PR2, the second lever 5 rotates by an angle according to what is described above.

In the step of releasing, the second apex 51 comes out of the circumferential groove 103, thereby releasing the device 10 and allowing it to move along the working axis D1.

The method comprises a step of removing the device 10 from the apparatus 1. The method comprises a step of withdrawing the wheel from the machine 1000.

In an embodiment, the method comprises a step removing the apparatus 1 from the machine 1000. The apparatus may, however, remain attached to the chuck.

The invention claimed is:

1. An apparatus for locking a wheel in a balancing machine, comprising:
   a first casing, which extends along a working axis, is internally hollow and includes a first slot and a second slot, passing through the first casing and extending along the working axis;
   a second casing, which extends along the working axis between a first end and a second end, is disposed inside the first casing and is movable along the working axis relative to the first casing to adopt an open position and a closed position which are spaced from each other along the working axis, wherein a locking direction is defined parallel to the working axis, directed from the first end of the second casing to the second end of the second casing;
   a first lever, which is angularly aligned with the first slot and is hinged to the first end of the second casing at a hinge to rotate between an extracted position, where it protrudes from the first slot, and a retracted position, the first lever including a respective first apex;
   a second lever, which is angularly aligned with the second slot and is hinged at the hinge of the second casing to rotate between a respective extracted position, where it protrudes from the second slot, and a respective retracted position, the second lever including a respective second apex, wherein, when the second casing is at the open position, the first lever and the second lever adopt the extracted position, and the first apex and the second apex are disposed at a corresponding first apex position, and, when the second casing is at the closed position, the first lever and the second lever adopt the retracted position, and the first apex and the second apex are disposed at a corresponding second apex position;
   a holding element, connected to the first lever and the second lever to hold each at the respective extracted position, wherein, for both the first apex and the second apex, the first apex position, compared to the second apex position, is shifted backwards in the locking direction and is thus shifted towards the second end of the second casing,
   whereby, in an open configuration, wherein the second casing is at the open position and the first lever and the second lever in the extracted position, the first apex and the second apex are shifted backwards with respect to the locking direction, compared to a closed configuration, wherein the second casing is at the closed position, the first lever and the second lever are in the retracted position and the first and the second apex are in the second apex position, and wherein
   the first lever comprises a first abutment wing, disposed on the side opposite to the first apex, relative to the hinge,
   the second lever comprises a second abutment wing, disposed on the side opposite to the second apex, relative to the hinge, and
   the second casing includes a first and a second shoulder wall, located at the first end of the second casing, the first and the second shoulder walls being configured to abut against the second and the first second abutment wing at the extracted position of the second and first wing, respectively.

2. The locking apparatus according to claim 1, wherein the first lever and the second lever comprise a first recessed surface and a second recessed surface, respectively, and wherein the first casing comprises a first abutment wall and a second abutment wall, the first abutment wall and the second abutment wall each including a respective inner edge, a respective outer edge and a respective abutment surface radially interposed between the corresponding inner edge and the corresponding outer edge, and wherein the first recessed surface and the second recessed surface are configured to come into contact with the first abutment wall and the second abutment wall at the abutment surface, respectively, to convert a displacement of the second casing along the working axis in a releasing direction opposite to the locking direction, into a rotation of the first lever (4) or the second lever from the respective extracted position to the respective retracted position.

3. The locking apparatus according to claim 2, wherein the first recessed surface and the second recessed surface have a curved profile and wherein the first abutment surface and the second abutment surface are in contact on the respective first recessed wall and second recessed wall so to permit a relative rotation.

4. The locking apparatus according to claim 2, wherein the first abutment wall and the second abutment wall are defined by one end of, respectively, the first slot and second slot, proximal to the first end of the second casing.

5. The locking apparatus according to claim 1, wherein, when the second casing is at the open position, the hinge is at a position further back from the first slot and the second slot along the working axis in the locking direction.

6. The locking apparatus according to claim 1, wherein the first abutment wing and the second abutment wing being configured to come into contact with each other when the first lever and the second lever are at the retracted position.

7. The locking apparatus according to claim 1, wherein the first lever comprises a first limit stop and a first abutment, disposed on opposite sides of the first lever relative to the hinge.

8. The locking apparatus according to claim 7, wherein the second lever comprises a second limit stop and a second abutment, disposed on opposite sides of the second lever relative to the hinge, wherein, when the first lever and the second lever are at the extracted position, the first limit stop comes into contact with the second abutment and the second limit stop comes into contact with the first abutment.

9. The locking apparatus according to claim 1, wherein the holding element is a compression spring oriented perpendicularly to the working axis and configured to apply a force which moves the first lever and the second lever apart to hold each at the respective extracted position.

10. A locking device for locking a wheel in a balancing machine, comprising:

a hollow cylindrical casing, extending along an axis of extension and including a cylindrical inside surface and a cylindrical outside surface;

a ratchet, made on the cylindrical inside surface and including a plurality of circumferential grooves, the circumferential grooves each including a first edge and a second edge, and a gripping surface arranged perpendicularly to the axis of extension, wherein the first edge defines a crest of the ratchet and is spaced from the axis of extension by a first radial distance, the second edge being spaced from the axis of extension by a second radial distance, greater than the first radial distance, and wherein the second edge is interposed between the first edge and the gripping surface and is chamfered to facilitate coupling each groove with a lever of a locking apparatus for locking the wheel in the balancing machine.

11. A locking unit for locking a wheel in a balancing machine comprising a locking apparatus and a locking device, wherein the locking apparatus comprises:

a first casing, which extends along a working axis, is internally hollow and includes a first slot and a second slot, passing through the first casing and extending along the working axis;

a second casing, which extends along the working axis between a first end and a second end, is disposed inside the first casing and is movable along the working axis relative to the first casing to adopt an open position and a closed position which are spaced from each other along the working axis;

a first lever, which is angularly aligned with the first slot and is hinged to the first end of the second casing at a hinge to rotate between an extracted position, where it protrudes from the first slot, and a retracted position, the first lever including a respective first apex;

a second lever, which is angularly aligned with the second slot and is hinged at the hinge of the second casing to rotate between a respective extracted position, where it protrudes from the second slot, and a respective retracted position, the second lever including a respective second apex, wherein, when the second casing is at the open position, the first lever and the second lever adopt the extracted position, and the first apex and the second apex are disposed at a corresponding first apex position, and, when the second casing is at the closed position, the first lever and the second lever adopt the retracted position, and the first apex and the second apex are disposed at a corresponding second apex position;

a holding element, connected to the first lever and the second lever to hold each at the respective extracted position, wherein, for both the first apex and the second apex, the first apex position is further back towards the second end of the second casing, than the second apex position, wherein the locking device comprises:

a hollow cylindrical casing, extending along an axis of extension and including a cylindrical inside surface and a cylindrical outside surface;

a ratchet, made on the cylindrical inside surface and including a plurality of circumferential grooves, the circumferential grooves each including a first edge and a second edge, and a gripping surface arranged perpendicularly to the axis of extension, wherein the first edge defines a crest of the ratchet and is spaced from the axis of extension by a first radial distance, the second edge being spaced from the axis of extension by a second radial distance, greater than the first radial distance, and wherein the second edge is interposed between the first edge and the gripping surface and is chamfered to facilitate coupling each groove with the respective first and second lever of the locking apparatus for locking the wheel in the balancing machine.

12. The locking unit of claim 11, wherein the first lever and the second lever of the locking apparatus are configured to be coupled with the plurality of circumferential grooves of the locking device.

13. An apparatus for locking a wheel in a balancing machine, comprising:

a first casing, which extends along a working axis, is internally hollow and includes a first slot and a second slot, passing through the first casing and extending along the working axis;

a second casing, which extends along the working axis between a first end and a second end, is disposed inside the first casing and is movable along the working axis relative to the first casing to adopt an open position and a closed position which are spaced from each other along the working axis, wherein a locking direction is defined parallel to the working axis, directed from the first end of the second casing to the second end of the second casing;

a first lever, which is angularly aligned with the first slot and is hinged to the first end of the second casing at a hinge to rotate between an extracted position, where it protrudes from the first slot, and a retracted position, the first lever including a respective first apex;

a second lever, which is angularly aligned with the second slot and is hinged at the hinge of the second casing to rotate between a respective extracted position, where it protrudes from the second slot, and a respective retracted position, the second lever including a respective second apex, wherein, when the second casing is at the open position, the first lever and the second lever adopt the extracted position, and the first apex and the second apex are disposed at a corresponding first apex position, and, when the second casing is at the closed position, the first lever and the second lever adopt the retracted position, and the first apex and the second apex are disposed at a corresponding second apex position;

a holding element, connected to the first lever and the second lever to hold each at the respective extracted position, wherein, for both the first apex and the second apex, the first apex position, compared to the second apex position, is shifted backwards in the locking direction and is thus shifted towards the second end of the second casing, whereby, in an open configuration, wherein the second casing is at the open position and the first lever and the second lever in the extracted position, the first apex and the second apex are shifted backwards with respect to the locking direction, compared to a closed configuration, wherein the second casing is at the closed position, the first lever and the second lever are in the retracted position and the first and the second apex are in the second apex position, and wherein the first lever comprises a first limit stop and a first abutment, disposed on opposite sides of the first lever relative to the hinge, the second lever comprises a second limit stop and a second abutment, disposed on opposite sides of the second lever relative to the hinge, wherein, when the first lever and the second lever are at the extracted position, the first limit stop comes into contact with the second abutment and the second limit stop comes into contact with the first abutment.

\* \* \* \* \*